June 12, 1951        C. H. TOMPKINS        2,556,456

SUPPORT FOR COMBINED SLIDABLE CONTAINERS AND CLOSURES

Filed Nov. 5, 1945        2 Sheets-Sheet 1

INVENTOR.
Chester H. Tompkins
BY
Smith & Wells
ATTORNEYS.

June 12, 1951  C. H. TOMPKINS  2,556,456
SUPPORT FOR COMBINED SLIDABLE CONTAINERS AND CLOSURES
Filed Nov. 5, 1945  2 Sheets-Sheet 2
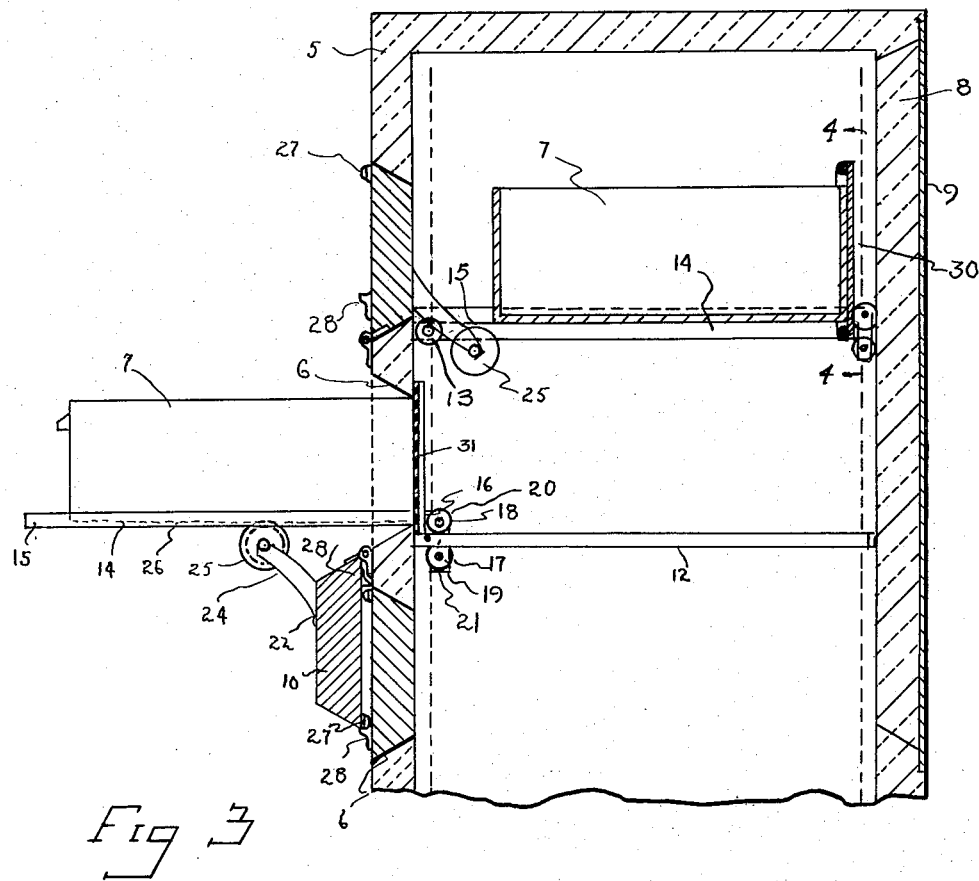
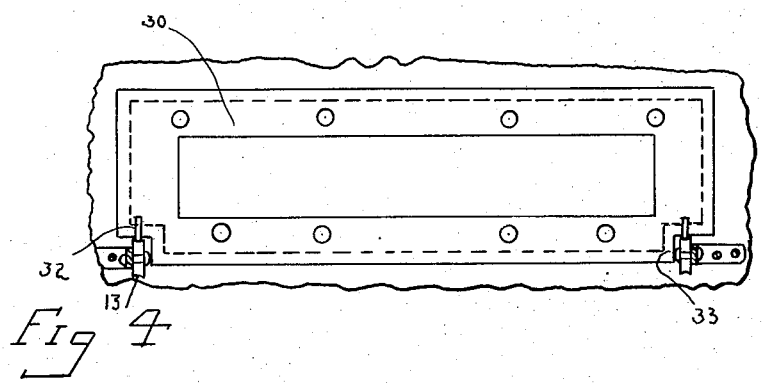
INVENTOR.
Chester H. Tompkins
BY Smith & Welle
ATTORNEYS.

Patented June 12, 1951

2,556,456

UNITED STATES PATENT OFFICE 2,556,456

SUPPORT FOR COMBINED SLIDABLE CONTAINERS AND CLOSURES

Chester H. Tompkins, Spokane, Wash., assignor of one-half to Edwin J. Cole, Walla Walla, Wash.

Application November 5, 1945, Serial No. 626,708

4 Claims. (Cl. 312—346)

This invention relates to improvements in a refrigerator cabinet and is particularly directed to a novel front closure and slidable food container arrangement whereby it is possible to store food in the container or remove food therefrom with a minimum loss in efficiency of the refrigerator due to warm air entering while food is being placed in or removed from the cooled chamber. In my use of the term refrigerator cabinet I include such devices as domestic cabinets, quick freeze low temperature units and large units such as commercial lockers where the chamber cooled may be very large with many food containers inserted therein.

It is a purpose of my invention to provide a novel food container and mounting therefor on the cabinet enabling the container to slide through a front opening in the cabinet from normal position inside the cabinet to loading or unloading position where it is almost entirely outside the cabinet and the cabinet is sealed to prevent entrance of warm air to the interior while the container is being loaded or unloaded, in combination with a novel supporting mechanism utilizing the closure door for the container receiving opening to provide firm support for the container when it is moved outwardly to loading or unloading position.

The novel features that I consider characteristic of my invention are set forth with particularity in the appended claims. The invention itself, however, both as to its organization, and its method of operation, together with additional objects and advantages thereof, will best be understood from the following description and the accompanying drawings illustrating a preferred form of the invention.

In the drawings:

Figure 3 is a vertical sectional view through the cabinet; and

Figure 4 is a fragmentary sectional view taken on the line 4—4 of Figure 3 and illustrating the sealing baffle which closes the cabinet when the food container is drawn out.

Figure 1:
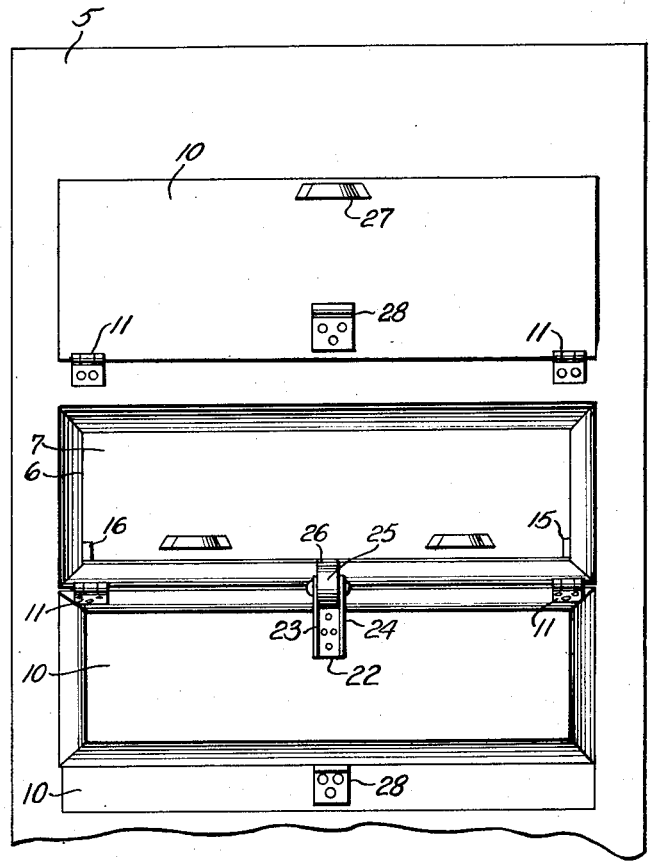
Figure 1 is a front view of a refrigerator cabinet in which my invention is incorporated one closure being shown in open position.

Referring now to the drawings, my invention is shown as applied to a refrigerator cabinet 5, suitably insulated and provided with a plurality of openings 6 in its front wall to receive food containers 7. The cabinet as shown also has a removable rear wall section 8 held in place by a cover plate 9 that is fastened down by screws. Closures 10 are provided for the openings 6. These closures are secured at their lower edges by hinges 11.

Figure 2:
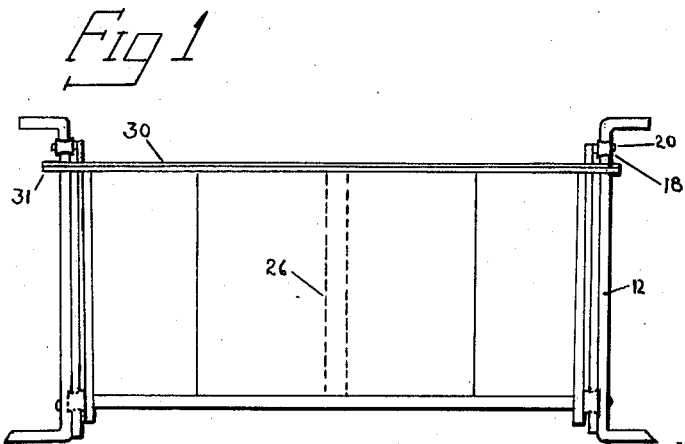
Figure 2 is a plan view of a food container which is used in the cabinet, also showing the side rails which support the food cabinet.

Within the cabinet are container supporting side rails 12 secured at their opposite ends to the cabinet walls. Each side rail at its forward end carries a small grooved roller 13. The containers 7 have side bars 14 extending from front to back at their lower edges. These bars have portions 15 and 16 that project beyond the container proper at the front and the back (see Figure 2). The rearwardly projecting portions 16 of the bars 14 have short depending lugs 17 thereon. There are grooved rollers 18 and 19 mounted on the depending lugs 17 by suitable stub shafts 20 and 21. The rollers 18 and 19 fit snugly over and beneath the side rails 12 so as to prevent vertical movement of the rear end of the container and to provide rolling bearing surfaces for engagement with the side rails.

The forwardly extending portions 15 of the bars 14 ride on the rollers 13 when the containers are moved into the cabinet all the way.

I also provide a novel means to support the containers when they are drawn out for placing food in them or removing food from them. A bracket 22 is mounted on the inner face of each of the doors 10. This bracket has ears 23 and 24 extending beyond the adjacent edge of the door and mounting a roller 25 between them. When the door 10 is closed the roller 25 lies below and in front of the container 7. When the door is opened the roller 25 is spaced outwardly from the cabinet so as to engage a central bar 26 on the bottom of a withdrawn container and provide support at about the mid-point of the container.

The weight in the containers 7 may be quite substantial. In order to protect the hinges of the doors 10, this weight is taken by means of the handle 27 on the open door 10 and a ledge 28 on the outer face of the closed door 10 immediately below. The ledge 28 is recessed slightly so that when the weight of the container comes upon it, the handle 27 will not slide off the ledge.

The container 7 carries a baffle plate 30 on the back end. This plate 30 is shown best in Figures 3 and 4. It is formed of a rectangular sheet of material with the center cut out and is fastened to the container by screws. A gasket 31 is secured to the baffle 30 around the periphery thereof. The bars 14 pass through the baffle so that the rear end portions 16 thereof do not interfere with the gasket 31 seating against the inner front face of the cabinet around the opening 6. The baffle is cut in at the lower corners at 32 and 33 to provide room for the rollers 13 and the side rails 12. When the container 7 is drawn out to its fullest extent the gasket 31 is seated against the inner side of the cabinet wall to seal the cabinet space and prevent warm air from entering. The gasket preferably is of a soft resilient tubular material so as to make a good seal. The supporting devices, hereinbefore described, for the containers keep them level in all positions so that the gaskets can fit evenly against the cabinet wall. The containers cannot tilt downward when they are drawn out to cause the gasket at the top of the baffle to engage before the gasket at the lower edge engages the cabinet wall.

It is believed that the foregoing description, and the accompanying drawings sufficiently disclose my invention to enable those skilled in the art to practice the same and obtain the advantages thereof.

Having described my invention, I claim:

1. The combination with a refrigerator cabinet having a series of vertically spaced container receiving openings in a wall thereof, individual closure doors for said openings, each door being hinged to the cabinet to swing downward in opening until the door is in substantially a depending vertical position to permit a food container in the cabinet to be pulled out over it, each door having an outwardly extending stop thereon near the top thereof which, when the door is opened, abuts the front face of the closed door therebelow, and each door having a supporting ledge on its outer face positioned to receive the stop of the opened door above it and to support the opened door, food containers mounted in said cabinet for sliding movement through the openings, and baffle plates on the back ends of said containers, larger than the openings therefor, and engaging with the inner side of the wall of the cabinet around the opening when the containers are withdrawn outwardly from the cabinet to seal the openings against air circulation therethrough, and means on the doors providing support for the containers, when they are moved outwardly from the openings.

2. The combination with a refrigerator cabinet having a series of vertically spaced container receiving openings in a wall thereof, individual closure doors for said openings, each door being hinged to the cabinet to swing downward in opening until the door is in substantially a depending vertical position to permit a food container in the cabinet to be pulled out over it, each door having an outwardly extending stop thereon near the top thereof which, when the door is opened, abuts the front face of the closed door therebelow, and each door having a supporting ledge on its outer face positioned to receive the stop of the opened door above it and to support the opened door, food containers mounted in said cabinet for sliding movement through the openings, and baffle plates on the back ends of said containers, larger than the openings therefor, and engaging with the inner side of the wall of the cabinet around the opening when the containers are withdrawn outwardly from the cabinet to seal the openings against air circulation therethrough, and means on the doors providing support for the containers, when they are moved outwardly from the openings, said last named means comprising rollers, and supports for said rollers, mounted on the inner sides of the doors.

3. The combination with a refrigerator cabinet having a series of vertically spaced container receiving openings in a wall thereof, of individual closure doors for said openings, each door being hinged to the cabinet to swing downwardly in opening to a substantially depending vertical position, food containers mounted in said cabinet for sliding movement through the openings, and means on the doors providing support for the containers when they are moved outwardly from the openings, each door having an outwardly extending stop thereon near the top thereof, and having a supporting ledge on the exterior thereof positioned to be engaged by and to support the stop of the door above it when the upper door is opened whereby to aid the upper door in carrying the load of a withdrawn container.

4. The combination with a refrigerator cabinet having a container receiving opening in an upright wall thereof, a closure door for said opening, said door being hinged to the cabinet to swing downward in opening to a depending substantially vertical position, to permit a food container in the cabinet to be pulled out over it, a food container mounted in the cabinet for sliding movement through the opening, sealing means on the back end of said container larger than the said opening and engaging with the sides of the inner wall of the cabinet around the opening, when the container is withdrawn outwardly from the cabinet, to prevent air circulation through said opening, a roller support on the inner face of the door, a roller carried by said support and held by said support, when the door is in open position, at the level of the bottom of said container, said container having a guide surface on the bottom thereof engaged by said roller as the container is pulled out whereby the roller supports the container, when it is fully drawn out, to prevent tilting of the container, said door having a stop thereon near the top and a ledge on the cabinet below the hinge of the door on which the stop rests and is supported when the door is open.

CHESTER H. TOMPKINS.

REFERENCES CITED

The following references are of record in the file of this patent:

UNITED STATES PATENTS

| Number | Name | Date |
|---|---|---|
| 231,643 | Baldwin | Aug. 31, 1880 |
| 552,522 | Fischer | Jan. 7, 1896 |
| 618,957 | Kelly | Feb. 7, 1899 |
| 729,859 | Von der Groeben | June 2, 1903 |
| 736,449 | Shanklin | Aug. 18, 1903 |
| 918,297 | Duffy | Apr. 13, 1909 |

FOREIGN PATENTS

| Number | Country | Date |
|---|---|---|
| 429,300 | Great Britain | May 28, 1935 |